United States Patent Office 2,709,672
Patented May 31, 1955

2,709,672

PRODUCTION OF CHLORTETRACYCLINE

Milton Andrew Petty, Jr., Pearl River, N. Y., assignor to American Cyanamid Company, New York, N. Y., a corporation of Maine No Drawing. Application April 4, 1952,
Serial No. 280,639

8 Claims. (Cl. 195—80)

My invention relates to a method for the production of chlortetracycline by the growth of high chlortetracycline yielding strains of *Streptomyces aureofaciens* under carefully controlled conditions on a new medium; and coincidentally, the production of cobalamins.

The organism *S. aureofaciens* is described in a U. S. patent to B. M. Duggar, 2,482,055, entitled Aureomycin and Preparation of the Same. Certain media suitable for the propagation of *S. aureofaciens* are described in a U. S. patent to J. G. Niedercorn, 2,609,329, entitled Process for Producing Aureomycin.

Organisms such as *S. aureofaciens* are fairly hardy and exist under a wide variety of conditions, but for the maximum production of desired elaboration products, the conditions and the media are very specific. The response to a variation in supporting medium can be very dramatic. The conditions for the maximum production of desired elaboration products are not necessarily the same as for the maximum growth of the organism.

I find that by using my improved medium and a high chlortetracycline-yielding strain of *S. aureofaciens*, yields of at least 2000 micrograms per milliliter of chlortetracycline may be produced in the mash, and also 500 or more micrograms per liter of cobalamins. Artificial and natural mutants of *S. aureofaciens* give variations in the yield of both chlortetracycline and the cobalamins. By the selection of mutant strains which give high yields, it is possible to increase the production of chlortetracycline and cobalamins. However, I have found that amazingly the earlier media would not give as high a yield with these strains as my medium. It appeared that the medium itself limited the production of chlortetracycline and cobalamins regardless of the strain of *S. aureofaciens* which was used. However, by the use of my improved medium, the production potential of strains which are obtained through mutation and other selective processes from the parent organism is utilized and they give a higher yield, and accordingly, the cost of production of these extremely important drugs is markedly reduced.

Processes and methods and agents used to induce mutation, and to select the desired mutants, are well known to those skilled in the art, and have been described at length in the literature.

All of the strains which are obtained through mutation and other natural and artificial selective processes from the parent organism *S. aureofaciens* are classed as *S. aureofaciens* in accordance with the rules of the International Botanical Congress. Certain of these strains produce much higher yields of chlortetracycline than the parent stock. Furthermore, I have found that the strains of *S. aureofaciens* which are capable of yielding the larger quantities of chlortetracycline may respond to variations in the medium to which the parent strains are not sensitive. Some strains respond more favorably than others to such a medium.

As chlortetracycline is known to contain chlorine, the media for its biosynthesis must necessarily have chlorine available. I find that inorganic chlorine as the chloride ion is readily used by *S. aureofaciens*. With low yielding strains, the chlorine present in tap water and available from other ingredients such as corn steep liquor, furnishes all of the chloride that can be effectively utilized. I have found that with higher yielding strains of *S. aureofaciens* more chloride must be supplied as more of it is actually present in chlortetracycline; and surprisingly, the utilization of the chloride ion is not nearly as efficient. At low yields the organism *S. aureofaciens* will use nearly all of the chloride ion in actual chlortetracycline production but with higher yielding strains a disproportionately larger quantity of chloride ion must be present for the maximum production of chlortetracycline. Too much chlorine is deleterious. The quantity required for the best results with high yielding strains is more than is advantageously supplied to lower yielding strains. The utilization of ionic chlorine to form non-ionic chlorine containing compounds, such as chlortetracycline, is unusual.

Similarly, in the production of the cobalamins, so called because they are naturally occurring cobalt-containing vitaminaceous compounds, cobalt must be present for any yield whatsoever, but very small quantities are adequate. Traces of cobalt occur in so many of the ingredients to the medium that in some instances additional cobalt is not necessary. Corn steep liquor from certain sources has enough cobalt so that an adequate quantity of cobalt is supplied for strains yielding a low cobalamin production. For maximum cobalamin production, particularly with the higher cobalamin-yielding strains of *S. aureofaciens*, a comparatively larger quantity of cobalt may be required. In view of the small quantities involved even so, I prefer to add enough cobalt to be certain of maximum cobalamin production inasmuch as a considerable excess does not appear to be deleterious.

For the growth of *S. aureofaciens*, an energy source is required which may be a carbohydrate such as sucrose, dextrose, starch, dextrine, or a combination of these. Also an organic nitrogen source is necessary, such as corn steep liquor, fish solubles, tankage, soybean meal, or hydrolyzed cottonseed meal, or a mixture of these.

More particularly, I have found that excellent results are obtained with a sterile medium which contains:

| | Parts |
|---|---|
| Water (not necessarily distilled) | 500 to 1500 |
| Organic nitrogen source (such as corn steep liquor, penicillin grade, 50% solids) | 20 to 40 |
| Calcium carbonate, finely ground | 4.5 to 15 |
| Carbohydrate (such as sucrose) | 20 to 40 |
| Ammonium ions | .5 to 2.5 |
| Chloride ions | .15 to 2.5 |

Furthermore, the medium must have certain trace elements for best results. Organic nitrogen sources, such as the corn steep liquor, and the water introduce small quantities of such trace elements. Sometimes it may be unnecessary to add additional of these elements but it is necessary that they be present in certain minimum amounts, either as impurities or as added constituents. It is preferred that there be present quantities amounting to at least:

| | |
|---|---|
| Magnesium | .1 to .5 |
| Iron | trace to .03 |
| Manganese | trace to .04 |
| Zinc | trace to .04 |
| Cobalt | trace to .01 |

Inasmuch as the quantities of these metallic elements required are small and a variation in concentration is not particularly critical, I prefer to add these elements in the required quantity rather than analyze for and rely in part upon the quantities present as impurities in the other ingredients.

Because the ions from the soluble salts are present in the medium in a dissociated state, their component elements or radicals may be added in different combinations of salts to give the same resultant medium. Accordingly, the concentration is defined in terms of the metallic contents. The metallic ions can be added as salts, or as acids, or bases, etc. For example, the metallic trace elements may be added as the sulfates or the chlorides or other soluble salts. Similarly, a certain amount of the chloride ion which is required may be added as ammonium chloride or calcium chloride, etc. It is convenient to have part of the cations present as sulfate salts as the sulfate ion is useful in aiding in pH control, and furnishes an innocuous anion for the salts. The desired cations may also be added as carbonates, salts with organic acids such as citric, or lactic, etc.

By a trace is meant the minimum naturally occurring quantity that is normally introduced as impurities in other constituents. It is neither desirable nor possible commercially to insure a complete absence of such constituents.

The trace elements such as iron, manganese, cobalt and zinc are required for most plant growth but the quantities are so small that nutrients such as corn steep liquor contain enough for effective growth although I find that additions as above indicated insure the adequacy and permit a more consistent production of high yield fermentations.

My new fermentation medium may be prepared from tap water rather than much more costly distilled water. I have found that United States east coast water such as is supplied in the city mains, is eminently satisfactory. The quality of the water may vary over wide limits, and between cities it does. One such tap water is the water supply of Pearl River, New York, which had the following analysis:

| | Parts per million |
|---|---|
| Dissolved solids | 140 to 146 |
| Silica | 8 to 8.5 |
| Iron | trace |
| Calcium | 25 to 35 |
| Magnesium | 11.2 to 14.7 |
| Sulfate | 11.2 to 29.2 |
| Chlorine | 11 to 15 |
| Nitrate | 1.0 to 2.5 |
| Hardness as calcium carbonate | 96.3 to 149.5 |

The water was found to have a pH of 7.6 to 7.8. The water is not critical and any potable water is satisfactory. Sterility is insured by the processing.

The medium may be mixed, then sterilized, or the components may be sterilized and then mixed under sterile conditions, or certain components may be mixed, sterilized, and the remainder added so as to maintain sterility. As a matter of convenience, a concentrated medium may be prepared, sterilized, and then diluted with sterile water.

For best results, such a medium should be aerated at the rate of 0.33 to 1.0 volumes of air per volume of solution per minute and agitated with an input in the neighborhood of 0.3 to 2 horsepower per 100 gallons to the impeller of the agitator. The aeration and agitation are inter-related in that a higher rate of agitation may be utilized with a lower rate of aeration, and vice versa. With the larger tanks, a lower horsepower input per 100 gallons capacity normally gives the same degree of agitation.

A sterile lard oil, with or without octadecanol, or a silicone-oil antifoam, or other foam inhibitor may be used to control the foaming of the medium in the fermentation tank.

The pH during the fermentation, as set forth in the Niedercorn patent, should remain between about 5 and 8. I find the best results are obtained within the range of about 6.2 to 6.6 measured after sterilization of the medium and just before its inoculation. Usually the medium as prepared has such a pH that adjustment is not necessary.

S. aureofaciens grows on my medium within the limits of about 20 to 35° C. Better results are obtained within a range of about 25 to 30° C. The mid point of this range, namely 27–28° C. is the preferred temperature range and the one which is normally used in plant production.

Some yield can be obtained by fermenting for as little as 24 hours, particularly when a large inoculum is used. The maximum growth usually occurs between about 60 and 72 hours and I prefer this range for the most economical production. However, a tank can be fermented for as long as 140 hours without an undue drop in potency. For most production such a long time would involve an undue capital expense to supply sufficient tanks for operation; but for various reasons in plant operation it may become convenient to keep a tank for this period or longer before processing to recover the chlortetracycline and cobalamins.

By way of illustration and not limitation, a specific example is herewith given. For purposes of convenience, the concentrations are expressed in grams per liter rather than the exact weight used. The latter may be calculated for any size of fermenting tank from the preferred concentration levels herewith given.

*Example 1*

For use in a 20,000 gallon fermenter, there was prepared an initial charge containing 2,000 gallons of water to which was added a sufficient quantity of ingredients so that when diluted to 20,000 gallons there would be present the listed concentrations:

| | Grams per liter |
|---|---|
| Corn steep liquor, penicillin grade, 50% solids | 30 |
| Calcium carbonate, USP XIII, light | 9 |
| Sucrose | 30 |
| Ammonium sulfate | 3.3 |
| Ammonium chloride | 1 |
| $MgCl_2.6H_2O$ | 2 |
| $FeSO_4.2H_2O$ | 0.041 |
| $MnSO_4.4H_2O$ | 0.05 |
| $ZnSO_4.7H_2O$ | 0.10 |
| $CoCl_2.6H_2O$ | 0.005 |

The materials were added in the order listed, with stirring. The concentrate was sterilized by heating to 120° C. for 40 minutes and aseptically transferred to the fermenter which had been previously sterilized by live steam. The concentrate was aerated, stirred and cooled in the fermenter, and thereto was added sufficient sterilized water from the city mains to dilute to the concentrations above given and fill the fermenter to 20,000 gallons. The temperature of the diluted medium was adjusted to 27° C. An anti-foaming agent consisting of lard oil containing 1% of octadecanol was added to a feed tank so that it could be added sterilely as required. 1 gram per liter was added initially and additional anti-foaming agent was added when needed to control foaming during the course of the fermentation. A total of 3 grams per liter was used during the course of the fermentation. The medium in the fermentation tank was inoculated with 4% by volume of a 25-hour growth seed tank containing a high yield strain of S. aureofaciens. The inoculated tank was aerated at the rate of 0.4 volumes of air per volume of mash per minute, the air being discharged near the bottom of the fermentation tank through a series of jet aerators designed to give a small bubble size. The contents of the fermentation tank were agitated by an impeller driven by a 90 horsepower motor operated at rated load. The aeration and agitation were conducted for 62 hours, at the end of which time the mash was harvested and found to contain 2500 micrograms per milliliter of chlortetracycline and 742 micrograms of vitamin $B_{12}$ per liter.

I claim:

1. A process for the production of chlortetracycline comprising preparing a sterile nutrient medium comprising:

| | Parts |
|---|---|
| Water | 500 to 1500 |
| Organic nitrogen source | 20 to 40 |
| Calcium carbonate, finely ground | 4.5 to 15 |
| Carbohydrate | 20 to 40 |
| Ammonium ions | .5 to 2.5 |
| Chloride ions | .15 to 2.5 |
| Magnesium | .1 to .5 |
| Iron | trace to .03 |
| Manganese | trace to .04 |
| Zinc | trace to .04 |
| Cobalt | trace to .01 | inoculating with a high yielding culture of *Streptomyces aureofaciens*, and permitting the growth of the *Streptomyces aureofaciens* until at least 2000 micrograms of chlortetracycline per milliliter are produced.

2. A process for the production of chlortetracycline comprising preparing a sterile nutrient medium comprising:

| | Parts |
|---|---|
| Water | 500 to 1500 |
| Corn steep liquor, penicillin grade, 50% solids | 20 to 40 |
| Calcium carbonate, finely ground | 4.5 to 15 |
| Sucrose | 20 to 40 |
| Ammonium ions | .5 to 2.5 |
| Chloride ions | .15 to 2.5 |
| Magnesium | .1 to .5 |
| Iron | trace to .03 |
| Manganese | trace to .04 |
| Zinc | trace to .04 |
| Cobalt | trace to .01 | inoculating with a high yielding culture of *Streptomyces aureofaciens*, and permitting the growth of the *Streptomyces aureofaciens* until at least 2000 micrograms of chlortetracycline per milliliter are produced.

3. A process for the production of chlortetracycline comprising preparing a sterile nutrient medium comprising:

| | Grams per liter |
|---|---|
| Corn steep liquor, penicillin grade, 50% solids | 30 |
| Calcium carbonate, USP XIII, light | 9 |
| Sucrose | 30 |
| Ammonium sulfate | 3.3 |
| Ammonium chloride | 1 |
| $MgCl_2.6H_2O$ | 2 |
| $FeSO_4.2H_2O$ | 0.041 |
| $MnSO_4.4H_2O$ | 0.05 |
| $ZnSO_4.7H_2O$ | 0.10 |
| $CoCl_2.6H_2O$ | 0.005 | inoculating with a high yielding culture of *Streptomyces aureofaciens*, and permitting the growth of the *Streptomyces aureofaciens* until at least 2000 micrograms of chlortetracycline per milliliter are produced.

4. A process for the production of chlortetracycline which comprises adding to a quantity of water comprising at least 20% of the final volume a quantity of ingredients sufficient to provide a medium having the following ingredients therein:

| | Parts |
|---|---|
| Water | 500 to 1500 |
| Organic nitrogen source | 20 to 40 |
| Calcium carbonate, finely ground | 4.5 to 15 |
| Carbohydrate | 20 to 40 |
| Ammonium ions | .5 to 2.5 |
| Chloride ions | .15 to 2.5 |
| Magnesium | .1 to .5 |
| Iron | trace to .03 |
| Manganese | trace to .04 |
| Zinc | trace to .04 |
| Cobalt | trace to .01 | sterilizing the concentrated medium and adding thereto sufficient sterile water to dilute to the final volume, inoculating with a high yielding culture of *Streptomyces aureofaciens*, and permitting the growth of the *Streptomyces aureofaciens* until at least 2000 micrograms of chlortetracycline per milliliter are thereby produced.

5. A process for the production of chlortetracycline which comprises adding to a quantity of water comprising at least 20% of the final volume a quantity of ingredients sufficient to provide a medium having the following ingredients therein:

| | Parts |
|---|---|
| Water | 500 to 1500 |
| Corn steep liquor, penicillin grade, 50% solids | 20 to 40 |
| Calcium carbonate, finely ground | 4.5 to 15 |
| Sucrose | 20 to 40 |
| Ammonium ions | .5 to 2.5 |
| Chloride ions | .15 to 2.5 |
| Magnesium | .1 to .5 |
| Iron | trace to .03 |
| Manganese | trace to .04 |
| Zinc | trace to .04 |
| Cobalt | trace to .01 | sterilizing the concentrated medium and adding thereto sufficient sterile water to dilute to the final volume, inoculating with a high yielding culture of *Streptomyces aureofaciens*, and permitting the growth of the *Streptomyces aureofaciens* until at least 2000 micrograms of chlortetracycline per milliliter are thereby produced.

6. A process for the production of both chlortetracycline and cobalamins which comprises adding to a quantity of water comprising at least 20% of the final volume a quantity of ingredients sufficient to provide a medium having the following ingredients therein:

| | Grams per liter |
|---|---|
| Corn steep liquor, penicillin grade, 50% solids | 30 |
| Calcium carbonate, USP XIII, light | 9 |
| Sucrose | 30 |
| Ammonium sulfate | 3.3 |
| Ammonium chloride | 1 |
| $MgCl_2.6H_2O$ | 2 |
| $FeSO_4.2H_2O$ | 0.041 |
| $MnSO_4.4H_2O$ | 0.05 |
| $ZnSO_4.7H_2O$ | 0.10 |
| $CoCl_2.6H_2O$ | 0.005 | sterilizing the concentrated medium and adding thereto sufficient sterile water to dilute to the final volume, inoculating with a high yielding culture of *Streptomyces aureofaciens*, aerating at a rate of from 0.33 to 1 volume of sterile air per volume of solution per minute, and agitating with an input of between 0.3 and 2 horsepower per 100 gallons, and permitting the growth of the *Streptomyces aureofaciens* until at least 2000 micrograms per milliliter of chlortetracycline and at least 742 micrograms per liter of cobalamins are thereby produced.

7. A process for the production of chlortetracycline which comprises fermenting, under submerged, aerated conditions, an aqueous nutrient medium containing chloride ions equivalent to approximately 1400 parts per million of medium, added as salts, by means of a chlortetracycline producing strain of *Streptomyces aureofaciens* until at least 2000 micrograms per milliliter of chlortetracycline are produced.

8. In the process of producing chlortetracycline by fermentation with a high chlortetracycline yielding culture of *Streptomyces aureofaciens,* of a sterile nutrient medium comprising:

| | Parts |
|---|---|
| Water | 500 to 1500 |
| Organic nitrogen source | 20 to 40 |
| Calcium carbonate, finely ground | 4.5 to 15 |
| Carbohydrate | 20 to 40 |
| Ammonium ions | .5 to 2.5 |
| Magnesium | .1 to .5 |
| Iron | trace to .03 |
| Manganese | trace to .04 |
| Zinc | trace to .04 |
| Cobalt | trace to .01 | the improvement which comprises, propagating *S. aureofaciens* in the presence of at least 150 parts of chloride ion, until at least 2000 micrograms of chlortetracycline per milliliter are produced.

References Cited in the file of this patent

UNITED STATES PATENTS

| | | |
|---|---|---|
| 2,482,055 | Duggar | Sept. 13, 1949 |
| 2,595,499 | Wood et al. | May 6, 1952 |
| 2,609,329 | Niedercorn | Sept. 2, 1952 |
| 2,619,420 | Jukes | Nov. 25, 1952 |

OTHER REFERENCES

Rickes et al., Science 108, December 3, 1948, pages 634–635.